United States Patent
Shimamoto et al.

(10) Patent No.: US 11,260,370 B2
(45) Date of Patent: Mar. 1, 2022

(54) COMPOSITION FOR EXHAUST GAS PURIFICATION, EXHAUST GAS PURIFYING CATALYST CONTAINING SAME, AND EXHAUST GAS PURIFYING CATALYST STRUCTURE

(71) Applicant: Mitsui Mining & Smelting Co., Ltd., Tokyo (JP)

(72) Inventors: Yasuhiro Shimamoto, Saitama (JP); Hironori Iwakura, Saitama (JP); Tomoya Hoshinoo, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/970,832

(22) PCT Filed: Mar. 26, 2019

(86) PCT No.: PCT/JP2019/012996
§ 371 (c)(1),
(2) Date: Aug. 18, 2020

(87) PCT Pub. No.: WO2019/189255
PCT Pub. Date: Oct. 3, 2019

(65) Prior Publication Data
US 2020/0376466 A1    Dec. 3, 2020

(30) Foreign Application Priority Data
Mar. 29, 2018    (JP) .............................. JP2018-063413

(51) Int. Cl.
*B01J 21/04*    (2006.01)
*B01J 23/10*    (2006.01)
(Continued)

(52) U.S. Cl.
CPC .......... *B01J 23/10* (2013.01); *B01D 53/9413* (2013.01); *B01J 35/0006* (2013.01);
(Continued)

(58) Field of Classification Search
CPC ........ B01J 21/04; B01J 23/10; B01J 35/0006; B01D 2255/2063; F01N 3/2803; F01N 2330/02; F01N 2370/02
(Continued)

(56) References Cited

U.S. PATENT DOCUMENTS 5,057,483 A * 10/1991 Wan ................... B01J 23/894
502/304
5,139,992 A * 8/1992 Tauster ............... B01J 35/0006
502/304
(Continued)

FOREIGN PATENT DOCUMENTS

CN    102424569 A    4/2012
JP    6-7683 A    1/1994
(Continued)

OTHER PUBLICATIONS

International Search Report (ISR) dated Jul. 2, 2019 filed in PCT/JP2019/012996.

*Primary Examiner* — Cam N. Nguyen
(74) *Attorney, Agent, or Firm* — Rankin, Hill & Clark LLP

(57) ABSTRACT

A composition for exhaust gas purification including first alumina including alumina containing lanthanum and second alumina including alumina containing lanthanum. The first alumina has a higher lanthanum content than the second alumina. The second alumina has a larger particle size than the first alumina. The lanthanum content of the first alumina is preferably 2 to 12 mass %, in terms of oxide, based on the total mass of alumina and lanthanum oxide of the first
(Continued)

alumina. The lanthanum content of the second alumina is preferably 9 mass % or less, in terms of oxide, based on the total mass of alumina and lanthanum oxide of the second alumina.

7 Claims, 2 Drawing Sheets

(51) Int. Cl.
    *B01J 35/00*     (2006.01)
    *F01N 3/28*     (2006.01)
    *B01D 53/94*     (2006.01)

(52) U.S. Cl.
    CPC .... *B01D 2255/2063* (2013.01); *F01N 3/2803* (2013.01); *F01N 2330/02* (2013.01); *F01N 2370/02* (2013.01)

(58) Field of Classification Search
    USPC .................. 502/302–303, 355, 415, 439
    See application file for complete search history.

(56) References Cited

U.S. PATENT DOCUMENTS

| | | | |
|---|---|---|---|
| 5,490,977 A * | 2/1996 | Wan | B01J 23/894 423/210 |
| 5,496,788 A | 3/1996 | Domesle et al. | |
| 5,597,771 A * | 1/1997 | Hu | F01N 3/106 502/304 |
| 5,948,377 A * | 9/1999 | Sung | B01J 23/63 423/213.5 |
| 5,948,723 A * | 9/1999 | Sung | B01J 37/038 502/303 |
| 5,958,829 A | 9/1999 | Domesle et al. | |
| 5,989,507 A * | 11/1999 | Sung | B01J 37/038 423/213.5 |
| 6,210,791 B1 * | 4/2001 | Skoog | C04B 41/009 428/325 |
| 6,294,140 B1 * | 9/2001 | Mussmann | B01J 35/04 423/213.5 |
| 6,524,992 B2 * | 2/2003 | Mussmann | B01J 23/42 502/304 |
| 9,868,087 B2 | 1/2018 | Kumatani et al. | |
| 2009/0208396 A1 * | 8/2009 | Yang | B01J 23/63 423/239.1 |
| 2010/0227758 A1 * | 9/2010 | Yang | B01J 23/63 502/303 |
| 2011/0030346 A1 | 2/2011 | Neubauer et al. | |
| 2011/0252773 A1 | 10/2011 | Arnold et al. | |
| 2017/0129816 A1 | 5/2017 | Deville et al. | |
| 2018/0043335 A1 | 2/2018 | Grubert et al. | |
| 2019/0152795 A1 | 5/2019 | Kawakami et al. | |

FOREIGN PATENT DOCUMENTS

| | | |
|---|---|---|
| JP | 2002-293514 A | 10/2002 |
| JP | 2003-98712 A | 4/2003 |
| JP | 2010-69380 A | 4/2010 |
| JP | 2013-500857 A | 1/2013 |
| JP | 2013-530332 A | 7/2013 |
| JP | 2016-185531 A | 10/2016 |
| JP | 2017-527508 A | 9/2017 |
| WO | 2002/005949 A1 | 1/2002 |
| WO | 2018/021192 A1 | 2/2018 |

\* cited by examiner

COMPOSITION FOR EXHAUST GAS PURIFICATION, EXHAUST GAS PURIFYING CATALYST CONTAINING SAME, AND EXHAUST GAS PURIFYING CATALYST STRUCTURE

CROSS-REFERENCE TO RELATED APPLICATIONS:

This application is a National Phase Application of International Application No. PCT/JP2019/012996, filed Mar. 26, 2019, which claims the priority of Japan Patent Application No. 2018-063413, filed Mar. 29, 2018. The present application claims priority from both applications and each of these applications is herein incorporated in their entirety by reference.

TECHNICAL FIELD

This invention relates to a composition for exhaust gas purification. It also relates to an exhaust gas purification catalyst containing the composition and an exhaust gas purification catalyst structure using the catalyst.

BACKGROUND ART

In order to improve exhaust gas purification performance at start-up of an internal combustion engine, a composition for exhaust gas purification having excellent light-off temperature characteristics has been sought for. The term "light-off temperature" means the temperature at which a composition for exhaust gas purification develops purification performance. A $NO_x$ adsorber is generally used as a means for conversion of $NO_x$, which is difficult to convert in low temperatures compared with other exhaust gas components. In particular, it is practiced to have $NO_x$ once adsorbed to a NO adsorber in low temperatures and, after elevation of the catalyst temperature, released therefrom to be converted.

Apart from the above technique, it is known to modify alumina as a support with lanthanum as disclosed, e.g., in patent literature 1 listed below in order to improve thermal stability of an inorganic porous material used as a support of an exhaust gas purification catalyst. According to this literature, the lanthanum-modified alumina is used to provide heat resistance. This alumina is not designed with consideration given to $NO_x$ adsorption.

Patent literature 2 also has a mention of an exhaust gas purification catalyst using lanthanum-modified alumina. In the literature, lanthanum-modified alumina is used as an oxygen storage capacity (OSC) material. This alumina is not designed with consideration given to $NO_x$ adsorption, either.

CITATION LIST

Patent Literature

Patent literature 1: JP 2010-69380A
Patent literature 2: JP 2016-185531A

SUMMARY OF INVENTION

An object of the invention is to provide an improvement of a composition for purifying exhaust gas from an internal combustion engine, more particularly, to provide a composition for exhaust gas purification that is excellent in not only thermal stability but low-temperature $NO_x$ adsorption performance.

As a result of extensive investigations, the inventors have found that a specific combination of two different species of lanthanum-containing alumina brings about improvements on not only heat resistance but also $NO_x$ adsorption performance. The present invention has been completed on the basis of this finding. The invention has made based on the above finding and accomplished the above object by providing a composition for exhaust gas purification, the composition comprising first alumina comprising alumina containing lanthanum and second alumina comprising alumina containing lanthanum. The first alumina has a higher lanthanum content than the second alumina. The second alumina has a larger particle size than the first alumina.

The invention also provides a catalyst for exhaust gas purification. The catalyst contains the composition for exhaust gas purification and a catalyst active component. The invention also provides a catalyst structure for exhaust gas purification, the catalyst structure including a catalyst substrate and a catalyst layer formed on the catalyst substrate. The catalyst layer contains the catalyst for exhaust gas purification.

EMBODIMENTS FOR CARRYING OUT INVENTION

Figure 1:
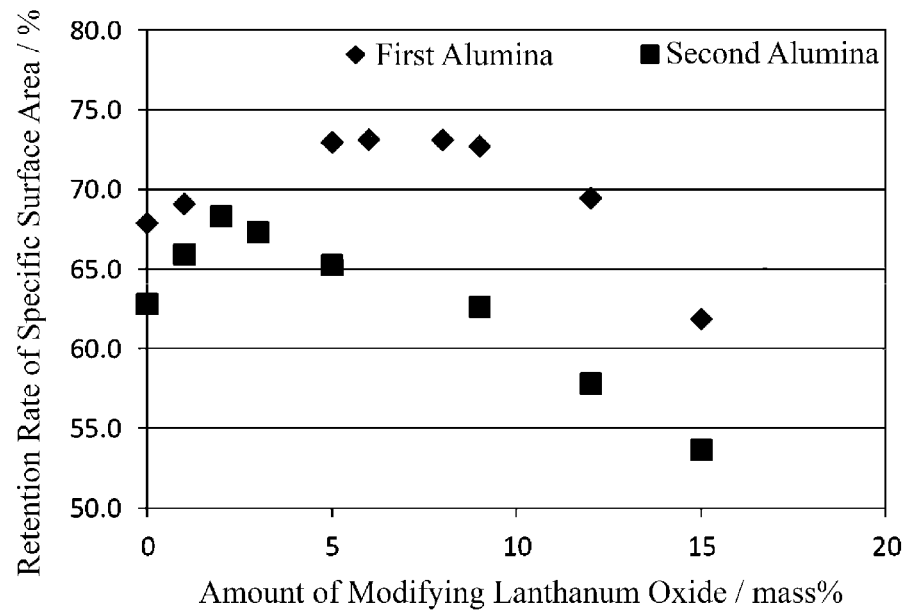
FIG. 1 is a graph showing the relationship between the amount of modifying lanthanum oxide and the retention rate of the specific surface area with the alumina particle size varied.

The invention will be described on the basis of its preferred embodiments. The composition for exhaust gas purification (hereinafter, also referred to as "exhaust gas purification composition") of the invention is used to purify exhaust gas from an internal combustion engine. The exhaust gas purification composition of the invention is characterized by using alumina powders of two different species. The two species of alumina are both particulate alumina containing lanthanum. As used herein, the expression "alumina containing lanthanum" (and derivative expressions) is intended to include the form in which an alumina particle is modified with lanthanum and the form in which lanthanum is dissolved in a solid state in alumina. The expression "an alumina particle is modified with lanthanum" (and derivative expressions) means that a lanthanum-containing compound is present on the surface of an alumina particle and encompasses the concept of "support". Taking the thermal stability of the exhaust gas purification composition into consideration, the form in which an alumina particle is modified with lanthanum is preferred to the form of a solid solution. In the case where alumina is modified with lanthanum, part of the lanthanum may be dissolved in a solid state in alumina.

When alumina is modified with lanthanum, the lanthanum-containing compound may be uniformly distributed or non-uniformly distributed, that is, localized on the surface of alumina particles. Examples of the lanthanum-containing compound include, but are not limited to, lanthanum oxide, lanthanum salts, and complex compounds containing lanthanum and an element other than lanthanum, such as complex oxides. Particularly preferred compounds are those containing lanthanum as a sole metallic element, such as oxide and salts. It should be noted that the form in which the surface of the alumina particles is modified with not only lanthanum but also an element other than lanthanum is not excluded from the scope of the invention.

The two different species of alumina powder are distinguished from each other in terms of lanthanum content and particle size. The two different species of alumina powder will be referred to as first alumina and second alumina for the sake of convenience. The terms "first alumina" and "second alumina" indicate either individual alumina particles or alumina powder as an aggregate of alumina particles, which depends on the context.

The first alumina has a higher lanthanum content than the second one. As used herein, the term "lanthanum content" with respect to the first alumina refers to the ratio (mass %) of lanthanum oxide ($La_2O_3$) to the total mass of alumina and lanthanum oxide, in terms of oxide, in the first alumina, and the term "lanthanum content" with respect to the second alumina refers to the ratio (mass %) of lanthanum oxide ($La_2O_3$) to the total mass of alumina and lanthanum oxide, in terms of oxide, in the second alumina. The lanthanum content can be measured as follows. The exhaust gas purification composition of the invention is observed under a scanning electron microscope (SEM) at an accelerating voltage of 10 kV and a magnification of 500×, and every particle is analyzed to quantitatively determine all the elements by the use of an energy-dispersive X-ray analyzer (EDX) attached to the SEM. The lanthanum content is calculated from the analysis results for every particle, and a distinction is made between first alumina particles and second alumina particles according to the lanthanum content. An arithmetic average of the lanthanum contents of at least 20 particles for each of the first and second alumina is calculated, which is taken as the lanthanum content of the first or second alumina.

The second alumina has a larger particle size than the first one. As used herein, the term "particle size" refers to the size of the lanthanum-containing alumina particles as measured by SEM observation. Specifically, a catalyst structure for exhaust gas purification including a catalyst substrate and a catalyst layer formed on the substrate is cut, and the particles of the catalyst layer present on the cut surface are observed using an SEM. The lanthanum content is determined for the individual particles using an EDX attached to the SEM. A distinction is made between first alumina particles and second alumina particles according to the lanthanum content. The Feret's diameter of at least 20 particles of each of the first alumina and the second alumina is measured. An arithmetic average of the found Feret's diameters is taken as the particle size of the first or second alumina.

The reason for the use of the first alumina and the second alumina different in lanthanum content and particle size is as follows. Incorporating lanthanum to alumina enhances heat resistance of the exhaust gas purification composition of the invention. To increase particle size of the lanthanum-containing alumina leads to further enhancement of the heat resistance of the exhaust gas purification composition of the invention. Incorporating lanthanum to alumina also enhances $NO_x$ adsorption performance of the exhaust gas purification composition of the invention. Nevertheless, to increase the amount of lanthanum used is not economically advantageous because lanthanum is relatively expensive.

In the present invention, the particle size of alumina is increased thereby to enhance heat resistance of the exhaust gas purification composition while the lanthanum content of the alumina particles with an increased size is relatively reduced in view of cost reduction and, on the other hand, a lanthanum content of alumina particles having a smaller size is relatively increased. Thus, both heat resistance and $NO_x$ adsorption performance are secured in the present invention. To use two alumina species different in lanthanum content and particle size thus makes it possible to provide the exhaust gas purification composition having enhanced heat resistance and $NO_x$ adsorption performance while avoiding an increase in cost.

To use two alumina species different in particle size produces the additional effect of preventing agglomeration among the larger alumina particles and among the smaller alumina particles because the smaller particles enter the gaps between larger particles. As a result, higher thermal stability than that obtained simply by modifying alumina with lanthanum is achieved.

Various substances are known as a $NO_x$ adsorber, including Ba, Sr, and Ce as well as lanthanum. Of these substances, lanthanum exhibits suitable $NO_x$ desorption performance particularly in relatively low temperatures, i.e., around 300° to 400° C. Because of this, lanthanum is superior to many other $NO_x$ adsorbers in balance between heat resistance and $NO_x$ conversion performance in low temperatures.

With a view to further ensuring heat resistance and $NO_x$ adsorption performance, the ratio of the lanthanum content $L_1$ of the first alumina to the lanthanum content $L_2$ of the second alumina, $L_1/L_2$, is preferably 2 to 18, more preferably 2 to 14, even more preferably 2 to 10.

With a view to improving heat resistance and $NO_x$ adsorption performance, the lanthanum content $L_1$ of the first alumina is preferably 2 to 12 mass %, more preferably 5 to 12 mass %, even more preferably 7 to 10 mass %. In terms of balance between heat resistance and cost, the lanthanum content $L_2$ of the second alumina is preferably 9 mass % or less, more preferably 1 to 9 mass %, even more preferably 1 to 5 mass %, provided that $L_2$ is smaller than $L_1$.

The lanthanum content of the exhaust gas purification composition of the present invention is preferably 1 to 15 mass %, more preferably 2 to 10 mass %, even more preferably 2.5 to 7.5 mass %, with a view to improving heat resistance and $NO_x$ adsorption performance.

With a view to further ensuring heat resistance and $NO_x$ adsorption performance, the ratio of the particle size $D_2$ of the second alumina to the particle size $D_1$ of the first alumina, $D_2/D_1$, is preferably 1.5 to 15, more preferably 1.5 to 9, even more preferably 2 to 7.

The particle size $D_1$ of the first alumina is preferably 2 to 15 μm, more preferably 4 to 12 μm, even more preferably 5 to 10 μm, in terms of balance between heat resistance and economy. In terms of balance between heat resistance and cost, the particle size $D_2$ of the second alumina is preferably 20 to 60 μm, more preferably 20 to 50 μm, even more preferably 20 to 40 μm, provided that $D_2$ is larger than $D_1$. There is no substantial difference in alumina particle size between before and after incorporation of lanthanum because the amount of lanthanum incorporated is small.

The ratio of the first alumina to the second alumina to be used in the exhaust gas purification composition is decided taking heat resistance, $NO_x$ adsorption performance, and cost into consideration. The mass ratio of the first alumina to the total mass of the first and second alumina is preferably 20 to 80 mass %, more preferably 30 to 70 mass %, even more preferably 50 to 70 mass %. The mass ratio of the second alumina to the total mass of the first and second alumina is preferably 20 to 80 mass %, more preferably 30 to 70 mass %, even more preferably 30 to 50 mass %.

The shape of the first and second alumina is not particularly limited, and alumina particles of any shape, such as spherical shape, may be used. The first and second alumina may be the same or different in shape.

The crystal system of the first and second alumina is not particularly limited, and alumina of any known crystal systems may be used, including α-alumina, β-alumina, γ-alumina, and θ-alumina. Gamma-alumina and θ-alumina are preferred in view of good balance between heat resistance, specific surface area, and $NO_x$ adsorption performance.

The first and second alumina may be the same or different in crystal system, but it is preferred for the first alumina to be γ-alumina, and for the second alumina to be θ-alumina. Gamma-alumina is capable of increasing $NO_x$ adsorption capacity through interaction with lanthanum as compared with alumina of other crystal systems. It is therefore preferred for the first alumina, which has a higher lanthanum content, to be γ-alumina with the intention of improving the $NO_x$ adsorption performance of the exhaust gas purification composition. On the other hand, θ-alumina is excellent in thermal stability as compared with alumina of other crystal systems. It is therefore preferred for the second alumina, which has a larger particle size, to be θ-alumina with the view of improving the heat resistance of the exhaust gas purification composition.

The first and second alumina are obtained by, for example, dispersing alumina particles with a previously adjusted particle size in an aqueous solution containing lanthanum, separating the solid from the resulting slurry, and heat treating the solid at a predetermined temperature. The aqueous solution containing lanthanum can be an aqueous solution of a water-soluble lanthanum salt. The heat treatment may be carried out, e.g., in an oxygen-containing atmosphere, such as the air.

The exhaust gas purification composition of the invention preferably has a BET specific surface area of 100 to 200 $m^2/g$, more preferably 120 to 180 $m^2/g$, even more preferably 130 to 150 $m^2/g$, before exposure to heat.

After exposure to heat, the exhaust gas purification composition preferably has a BET specific surface area of 60 to 150 $m^2/g$, more preferably 70 to 120 $m^2/g$, even more preferably 80 to 100 $m^2/g$. The phrase "after exposure to heat" means after being heat treated at 1100° C. for 4 hours in air containing 10 vol % water vapor. With such BET specific surface area characteristics, the exhaust gas purification composition of the invention exhibits high heat resistance and improved $NO_x$ adsorption performance. The BET specific surface area of that range can be achieved through, for example, appropriate adjustment of the particle sizes of the first and second alumina or the mixing ratio between the first and second alumina. The BET specific surface area is measured by the BET single-point method.

The catalyst for exhaust gas purification (hereinafter also referred to as "exhaust gas purification catalyst") according to the present invention includes a catalyst active component in addition to the exhaust gas purification composition of the invention (i.e., the first/second alumina). Combining the exhaust gas purification composition of the invention with a catalyst active component provides an exhaust gas purification catalyst that delivers high purification performance. Examples of the catalyst active component include at least one member selected from Ag, Mn, Ni, Pt, Pd, Rh, Au, Cu, Fe, Ir, and Co. In the exhaust gas purification catalyst, the catalyst active component may exist in the form of metal or a metal oxide.

In order to obtain assured purification performance, it is preferred for the exhaust gas purification catalyst of the invention to contain at least one selected from Pt, Pd, Rh, and Ir as a catalyst active component. The catalyst active component may be supported on the surface of the first alumina and/or the second alumina in the exhaust gas purification composition or be in a mixed state with the first alumina and/or the second alumina in the exhaust gas purification composition.

The proportion of the catalyst active component in the exhaust gas purification catalyst is preferably 0.1 to 15 mass % in view of enhancement of heat resistance of the purification performance and production cost of the catalyst. From that viewpoint, the proportion is more preferably 0.1 to 7 mass %, even more preferably 0.1 to 5 mass %, in the exhaust gas purification composition.

The amount of the catalyst active component can be determined by measuring by ICP-AES the amount of Ag, Mn, Ni, Pt, Pd, Rh, Au, Cu, Fe, Co, etc. in a solution sample prepared by dissolving the exhaust gas purification catalyst.

The total amount of the first and second alumina species in the exhaust gas purification catalyst is preferably 99.9 mass % or less, more preferably 95 mass % or less, even more preferably 93 mass % or less, still more preferably 15 to 90 mass %.

The exhaust gas purification catalyst of the invention may contain a binder for applying the catalyst onto a catalyst substrate. Examples of the binder include alumina sol and zirconia sol. In using a binder, the binder content in the exhaust gas purification catalyst is preferably 5 to 20 mass % in order not to damage the exhaust gas purification performance or adhesion strength.

The exhaust gas purification catalyst of the invention may further contain, in addition to the catalyst active component and binder described above, an inorganic porous material, such as $Al_2O_3$ other than the first and second alumina, $TiO_2$, $SiO_2$, zeolite, MgO, or $MgAl_2O_4$, as a component serving primarily as a support. The exhaust gas purification catalyst may furthermore contain an OSC material, such as $CeO_2$ or $CeO_2$—$ZrO_2$ double oxide, as a component serving primarily for oxygen storage. The exhaust gas purification catalyst may also contain an additional $NO_x$ adsorber other than La, such as Ba, Sr, and/or Ce.

The total content of the inorganic porous materials including the first and second alumina in the exhaust gas purification catalyst is preferably 99.9 mass % or less, more preferably 95 mass % or less, even more preferably 93 mass % or less, still more preferably 15 to 90 mass %.

The content of the OSC material in the exhaust gas purification catalyst is preferably 5 to 30 mass %, more preferably 5 to 20 mass %, in terms of heat resistance, $NO_x$ adsorption performance, and oxygen storage capacity.

The exhaust gas purification catalyst of the invention may be prepared by, for example, mixing a catalyst active component into a powder or slurry containing the exhaust gas purification composition of the invention.

The catalyst may alternatively be prepared by dispersing the exhaust gas purification composition of the invention in powder form in a solution containing a catalyst active component in the form of nitrate, oxalate, acetate, ammine complex salt, chloride, or the like to make a slurry, drying the slurry, and firing the solid. The solvent used in the solution and slurry may be water.

The catalyst structure for exhaust gas purification (hereinafter also referred to as "exhaust gas purification catalyst structure") according to the invention includes a catalyst substrate and a catalyst layer on the catalyst substrate. The catalyst layer has the exhaust gas purification catalyst of the invention.

The exhaust gas purification catalyst structure may be prepared by, for example, applying the above described slurry to a catalyst substrate, drying the applied slurry, and firing. The firing is preferably carried out in the atmosphere at 450° to 600° C. for a period of 1 to 3 hours.

The catalyst substrate may be made, e.g., of ceramics or metallic materials. Examples of ceramics for the catalyst substrate include alumina ($Al_2O_3$), mullite ($3Al_2O_3$—$2SiO_2$), cordierite ($2MgO$—$2Al_2O_3$—$5\ SiO_2$), aluminum titanate ($Al_2TiO_5$), and silicon carbide (SiC). The metallic materials for the catalyst substrate are exemplified by stainless steel. While the shape of the catalyst substrate is not particularly limited, the substrate preferably has the form of a honeycomb, pellets, a filter, and so on.

In the exhaust gas purification catalyst structure of the invention, the catalyst layer may have a multi-layered structure. For example, the catalyst layer may include a first catalyst layer formed on one side of the substrate and a second catalyst layer formed on a side of the first catalyst layer that is the other side than the side facing to the substrate. In this case, either one or both of the first and the second catalyst layer contains the exhaust gas purification catalyst of the invention. It is preferred that the exhaust gas purification catalyst of the invention be present in the first catalyst layer in view of heat resistance and $NO_x$ adsorption performance.

In the exhaust gas purification catalyst structure of the invention, the catalyst layer may have a zoned structure. For example, a catalyst layer formed on the side of a single catalyst substrate may be zoned into an upstream catalyst zone and a downstream catalyst zone along the flow direction of exhaust gas, either one or both of the upstream and downstream catalyst zones containing the exhaust gas purification composition of the invention.

The exhaust gas purification catalyst structure of the invention may have a tandem structure. For example, the catalyst structure may be composed of two catalyst substrates: an upstream substrate having an upstream catalyst layer formed thereon and a downstream substrate having a downstream catalyst layer formed thereon. The upstream and downstream substrates with the respective catalyst layers are arranged in tandem along the direction of the exhaust gas flow, and either one or both of the upstream and downstream catalyst layers contains the exhaust gas purification composition of the invention.

The upstream catalyst layer is to be located closer to an engine. When the exhaust gas purification catalyst containing the exhaust gas purification composition of the invention is applied to the upstream catalyst layer, the exhaust gas purification performance is maintained for an extended period of time with higher efficiency since the composition of the invention has reliable thermal stability as described above.

The downstream catalyst layer, on the other hand, is to be located in an environment farther from the engine where the heat of the engine is less conducted. Even when the exhaust gas purification catalyst containing the exhaust gas purification composition of the invention is applied to the downstream catalyst layer, the catalyst structure is superior to conventional ones in $NO_x$ adsorption performance in a low temperature environment immediately after engine start-up since the exhaust gas purification composition of the invention delivers excellent $NO_x$ adsorption performance.

The exhaust gas purification catalyst of the invention containing the exhaust gas purification composition of the invention exhibits stable exhaust gas purification performance even when exposed to high temperatures as high as about 900° to 1150° C. Thus, the exhaust gas purification catalyst of the invention and the catalyst structure containing the catalyst have excellent heat resistance, and are therefore suitably used to purify exhaust gas from gasoline engines, such as of automobiles and motor cycles, particularly to convert $NO_x$.

EXAMPLES

The invention will now be illustrated in greater detail with reference to Examples, but it should be understood that the invention is not construed as being limited thereto. Unless otherwise specified, all the percentages and parts are by mass.

Preliminary Experiment

How the alumina particle size and the lanthanum content have influences on heat resistance was examined.

Spherical γ-alumina particles with a Feret's diameter of 8 μm and lanthanum nitrate were dispersed in water to make a slurry, which was evaporated to dryness. The resulting solid was heat treated at 600° C. for 3 hours to give lanthanum oxide-modified alumina as first alumina. The Feret's diameter of the first alumina was 8 μm. Eight types of the first alumina were prepared by varying the amount $L_1$ of the modifying lanthanum oxide.

Spherical θ-alumina particles with a Feret's diameter of 35 μm and lanthanum nitrate were dispersed in water to make a slurry, which was evaporated to dryness. The resulting solid was heat treated at 600° C. for 3 hours to give lanthanum oxide-modified alumina as second alumina. The Feret's diameter of the second alumina was 35 μm. Eight types of the second alumina were prepared by varying the amount $L_2$ of the modifying lanthanum oxide.

Each of the various types of the first and second alumina was analyzed for BET specific surface area $S_1$ immediately after preparation and BET specific surface area $S_2$ after heating at 1100° C. for 4 hours in air containing 10 vol % water by the above described method. The retention rate of the BET specific surface area was calculated from $S_2/S_1 \times 100$. The results are shown in FIG. 1. A larger retention rate of the BET specific surface area indicates higher heat resistance. As is apparent from the results in FIG. 1, the first alumina modified with 2 to 12% lanthanum oxide exhibits high heat resistance, while the second alumina modified with 9% or less lanthanum oxide shows high heat resistance.

Example 1

(1) Provision of First and Second Alumina

The first alumina having $L_1$ (the amount of modifying lanthanum oxide relative to the total amount of alumina and lanthanum oxide) of 9% as prepared in the preliminary experiment above was provided. The Feret's diameter of the first alumina was 8 μm. The second alumina having $L_2$ (the amount of modifying lanthanum oxide relative to the total amount of alumina and lanthanum oxide) of 1% was provided. The Feret's diameter of the second alumina was 35

µm. The Feret's diameters of the first and second alumina were measured using an SEM as stated hereinbefore.

(2) Preparation of Exhaust Gas Purification Composition 70 parts of the first alumina and 30 parts of the second alumina were mixed to prepare an exhaust gas purification composition. The BET specific surface area of the composition before being exposed to heat was found to be 133.3 m²/g.

Example 2

An exhaust gas purification composition was prepared from 50 parts of the first alumina and 50 parts of the second alumina in the same manner as in Example 1-(2). The BET specific surface area of the composition before being exposed to heat was found to be 136.0 m²/g.

Example 3

An exhaust gas purification composition was prepared from 30 parts of the first alumina and 70 parts of the second alumina in the same manner as in Example 1-(2). The BET specific surface area of the composition before being exposed to heat was found to be 143.2 m²/g.

Comparative Example 1

An exhaust gas purification composition was prepared in the same manner as in Example 1 except that the second alumina was not used in Example 1-(2).

Comparative Example 2

An exhaust gas purification composition was prepared in the same manner as in Example 1 except that the first alumina was not used in Example 1-(2).

Comparative Example 3

An exhaust gas purification composition was prepared in the same manner as in Example 2 except that first alumina that was not modified with lanthanum oxide was provided in Example 2-(1).

Comparative Example 4

An exhaust gas purification composition was prepared in the same manner as in Example 2 except that second alumina that was not modified with lanthanum oxide was provided in Example 2-(1).

Comparative Example 5

An exhaust gas purification composition was prepared in the same manner as in Example 2 except that first alumina having $L_1$ of 1% and second alumina having $L_2$ of 9% were provided in Example 2-(1).

Evaluation

Figure 2:
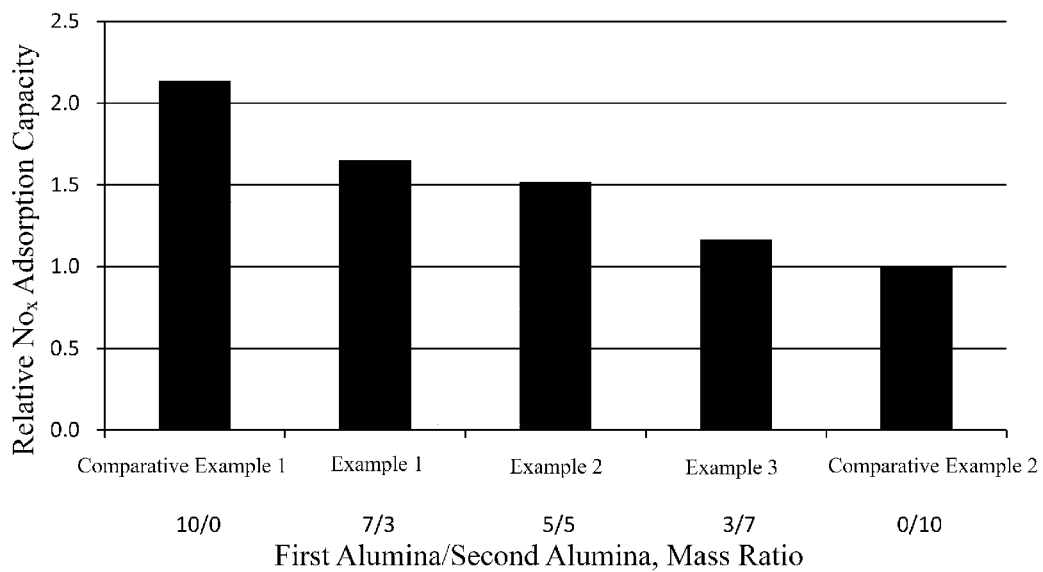
FIG. 2 is a graph showing the relationship between the mixing ratio of the first to second alumina and the $NO_x$ adsorption capacity.
Figure 3:
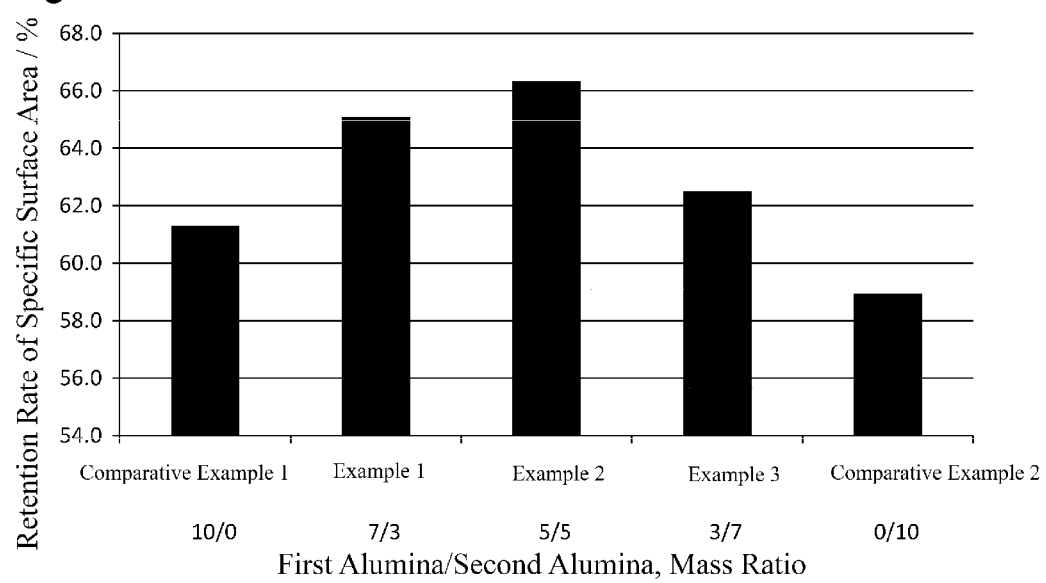
FIG. 3 is a graph showing the relationship between the mixing ratio of first to second alumina and the retention rate of the specific surface area.

The exhaust gas purification compositions obtained in Examples 1 to 3 and Comparative Examples 1 to 5 were evaluated for heat resistance and $NO_x$ adsorption performance in accordance with the methods below. The results obtained are shown in FIGS. 2 and 3 and Table 1. In Table 1, "SSA" stands for specific surface area.

Evaluation of Heat Resistance

The exhaust gas purification composition was analyzed for BET specific surface area immediately after preparation ($SSA_1$) and after heating at 1100° C. for 4 hours in air containing 10 vol % water ($SSA_2$) by the method described above. The retention rate of the BET specific surface area was calculated from $SSA_2/SSA_1 \times 100$.

Evaluation of $NO_x$ Adsorption Performance $NO_x$ adsorption of the exhaust gas purification composition after heating at 1100° C. for 4 hr in air containing 10 vol % water was evaluated in terms of $NO_x$ adsorption capacity at 50° C. by the TPD method. The peak area of the TPD spectrum was taken as the adsorption capacity.

The TPD was carried out as follows. A sample was pretreated by heating in an He (40 mL/min) and $O_2$ (10 mL/min) stream up to 600° C. over 30 minutes, keeping at that temperature for 30 minutes, cooling to 50° C. over 10 minutes, and maintaining in an He (50 mL/min) stream for 10 minutes. The sample was then maintained in a stream of 30 mL/min He, 10 mL/min $O_2$, and 10 mL/min NO (2%)+$N_2$ (98%) for 60 minutes to adsorb $NO_x$ and then maintained in a He (50 mL/min) stream for 5 minutes. TPD measurement was made by elevating the temperature from 50° C. to 650° C. at a rate of 10° C./min in a He (50 mL/min) stream. The results shown in Table 1 and FIG. 2 are relative values, with the result of Comparative Example 2 taken as 1.

TABLE 1

| | Exhaust Gas Purification Composition | | | | | | Evaluation | |
|---|---|---|---|---|---|---|---|---|
| | First Alumina | | | Second Alumina | | | | |
| | Particle Size (µm) | Amount L1 of Modifying La₂O₃ (mass %) | Content (part by mass) | Particle Size (µm) | Amount L2 of Modifying La₂O₃ (mass %) | Content (part by mass) | La₂O₃ Content of Composition (mass %) | Relative NO$_x$ Adsorption Capacity | Retention Rate of SSA (%) |
| Example 1 | 8 | 9.0 | 70 | 35 | 1.0 | 30 | 6.6 | 1.7 | 65 |
| Example 2 | 8 | 9.0 | 50 | 35 | 1.0 | 50 | 5.0 | 1.5 | 66.5 |
| Example 3 | 8 | 9.0 | 30 | 35 | 1.0 | 70 | 3.4 | 1.2 | 62.5 |
| Comparative Example 1 | 8 | 9.0 | 100 | 35 | 1.0 | 0 | 9.0 | 2.1 | 61 |
| Comparative Example 2 | 8 | 9.0 | 0 | 35 | 1.0 | 100 | 1.0 | 1.0 | 59 |
| Comparative Example 3 | 8 | 0.0 | 50 | 35 | 1.0 | 50 | 0.5 | 0.7 | 52 |

TABLE 1-continued

| | Exhaust Gas Purification Composition | | | | | | Evaluation | |
|---|---|---|---|---|---|---|---|---|
| | First Alumina | | | Second Alumina | | | | |
| | Particle Size (μm) | Amount L1 of Modifying La$_2$O$_3$ (mass %) | Content (part by mass) | Particle Size (μm) | Amount L2 of Modifying La$_2$O$_3$ (mass %) | Content (part by mass) | La$_2$O$_3$ Content of Composition (mass %) | Relative NO$_x$ Adsorption Capacity | Retention Rate of SSA (%) |
| Comparative Example 4 | 8 | 9.0 | 50 | 35 | 0.0 | 50 | 4.5 | 1.4 | 60 |
| Comparative Example 5 | 8 | 1.0 | 50 | 35 | 9.0 | 50 | 5.0 | 1.5 | 58 |

As is apparent from the results in FIGS. 2 and 3 and Table 1, exhaust gas purification performance with well-balanced heat resistance and NO$_x$ adsorption performance is achieved with a minimal amount of modifying lanthanum when using a mixture of the first and second alumina having specific particle sizes and lanthanum contents.

Example 4

(3) Preparation of Exhaust Gas Purification Catalyst

The exhaust gas purification composition obtained in Example 1 and an OSC material were added to and stirred in an aqueous solution of palladium nitrate and rhodium nitrate to prepare an exhaust gas purification catalyst slurry. The amounts of Pd and Rh were 0.5% and 0.1%, respectively, based on to the mass of the exhaust gas purification composition. As the OSC material, CeO$_2$—ZrO$_2$ double oxide was used. The mass ratio of the exhaust gas purification composition to the OSC material, the former: the latter, was 7:1.

(4) Loading of Exhaust Gas Purification Catalyst on Catalyst Substrate

The catalyst slurry prepared was applied to the surface of a honeycomb substrate (available from NGK Insulators, Ltd.; 25 mm (D)×30 mm (L); 300 cells per square inch; volume: 0.015 L). After an excess of the slurry was blown off, the catalyst slurry layer was dried by directly applying hot air at 70° C. and then fired at 450° C. for 1 hour to remove nitrate groups to provide an exhaust gas purification catalyst structure having a catalyst layer on the honeycomb substrate. The amount of the catalyst layer loaded on the substrate was 250 g per liter of the volume of the substrate.

Comparative Example 6

An exhaust gas purification catalyst structure was made in the same manner as in Example 4, except that in Example 4-(3), the exhaust gas purification composition prepared in Example 1 was replaced with the exhaust gas purification composition prepared in Comparative Example 1.

Comparative Example 7

An exhaust gas purification catalyst structure was made in the same manner as in Example 4, except that in Example 4-(3), the exhaust gas purification composition prepared in Example 1 was replaced with the exhaust gas purification composition prepared in Comparative Example 2.

Evaluation

The exhaust gas purification catalyst structures of Example 4 and Comparative Examples 6 and 7 were evaluated for NO$_x$ conversion performance according to the following method.

Evaluation of NO$_x$ Conversion Performance

The exhaust gas purification catalyst structures of Example 4 and Comparative Examples 6 and 7 were heated at 1000° C. for 25 hours in the atmosphere. After the heating, the T50 measurement for NO$_x$ was made on each catalyst structure by the following method to evaluate the NO$_x$ conversion performance. The results are shown in Table 2.

Method for T50 Measurement:

The exhaust gas purification catalyst structure was set in a gas flow reactor, and a simulated exhaust gas having the composition shown below was made to flow through the catalyst. The temperature of the gas flowing into the catalyst structure was gradually raised from room temperature. The NO$_x$ concentrations in the exhaust gas before and after passage through the catalyst structure were measured, and the NO$_x$ conversion was calculated from the following expression:

$$NO_x \text{ Conversion } (\%) = (A-B)/A \times 100$$

where A is the NO$_x$ concentration before the passage, and B is the NO$_x$ concentration after the passage.

The temperature of the gas flowing into the catalyst structure at which a NO$_x$ conversion reached 50%, namely light-off temperature T50, was determined.

Simulated exhaust gas composition (by volume): CO, 0.5%; C$_3$H$_6$, 1200 ppmC; NO, 500 ppm; O$_2$, 0.50%; CO$_2$, 14%; H$_2$O, 10%; H$_2$, 0.17%; N$_2$, the balance.

Upstream air fuel ratio: A/F=14.6

Rate of temperature rise: 20° C./min

Measurement of HC, NO$_x$, and CO concentrations: Motor Exhaust Gas Analyzer MEXA7100 from Horiba, Ltd. was used.

TABLE 2

| | NO$_x$ Conversion Performance, T50 (° C.) |
|---|---|
| Example 4 | 356 |
| Comparative Example 6 | 363 |

TABLE 2-continued

| | NOₓ Conversion Performance, T50 (° C.) |
|---|---|
| Comparative Example 7 | 366 |

As shown in Table 2, the exhaust gas purification catalyst structure of Example 4 is superior to those of Comparative Examples 6 and 7 in $NO_x$ conversion performance.

Although the exhaust gas purification composition of Comparative Example 1 is superior to that of Example 1 in $NO_x$ adsorption capacity, the exhaust gas purification catalyst of Comparative Example 6, which contains the composition of Comparative Example 1, is inferior in $NO_x$ conversion performance to that of Example 4. This is probably because of the lower retention rate of the specific surface area in Comparative Example 1.

INDUSTRIAL APPLICABILITY

The invention provides an exhaust gas purification composition excellent in not only thermal stability but also low-temperature $NO_x$ adsorption performance. The invention also provides the exhaust gas purification composition having such characteristics at low cost.

The invention claimed is:

1. A composition for exhaust gas purification, comprising first alumina comprising alumina containing lanthanum and second alumina comprising alumina containing lanthanum, the first alumina having a higher lanthanum content than the second alumina, and the second alumina having a larger particle size than the first alumina, wherein the first alumina has a lanthanum content of 2 to 12 mass %, in terms of oxide, based on the total mass of the alumina and lanthanum oxide of the first alumina, and the second alumina has a lanthanum content of 5 mass % or less, in terms of oxide, based on the total mass of the alumina and lanthanum oxide of the second alumina, the ratio of the lanthanum content $L_i$ of the first alumina to the lanthanum content $L_2$ of the second alumina is 2 to 18, and the particle size of the first alumina is 2 to 15 μm and the particle size of the second alumina is 20 to 60 μm each size of the first alumina and the second alumina being an arithmetic average of Feret's diameters determined by using a scanning electron microscope.

2. The composition according to claim 1, wherein a ratio of the particle size of the second alumina to the particle size of the first alumina is 1.5 to 15.

3. The composition according to claim 1, wherein the mass ratio of the first alumina to the total mass of the first alumina and the second alumina is 20 to 80 mass %, and the mass ratio of the second alumina to the total mass of the first alumina and the second alumina is 80 to 20 mass %.

4. The composition according to claim 1, wherein the first alumina comprises γ-alumina, and the second alumina comprises θ-alumina.

5. A catalyst for exhaust gas purification, comprising the composition according to claim 1 and a catalyst active component, wherein the catalyst active component is at least one selected from a group consisting of Ag, Mn, Ni, Pt, Pd, Rh, Au, Cu, Fe, Ir, and Co.

6. A catalyst structure for exhaust gas purification, comprising a catalyst substrate, a first catalyst layer formed on one side of the catalyst substrate, and a second catalyst layer formed on a side of the first catalyst layer that is the other side than the side facing to the catalyst substrate, either one of the first catalyst layer or the second catalyst layer or both of the first catalyst layer and the second catalyst layer comprising the catalyst according to claim 5.

7. A catalyst structure for exhaust gas purification, comprising a catalyst substrate, a first catalyst layer formed on one side of the catalyst substrate, and a second catalyst layer formed on a side of the first catalyst layer that is the other side than the side facing to the catalyst substrate, both of the first catalyst layer and the second catalyst layer comprising the catalyst according to claim 5.

* * * * *